Patented July 22, 1952

2,604,402

UNITED STATES PATENT OFFICE 2,604,402

METHOD OF ACCELERATING THE GROWTH OF CHICKS

Charles M. Ely, Springdale, Ohio, assignor to National Distillers Products Corp., a Virginia corporation No Drawing. Application April 26, 1951, Serial No. 223,160

3 Claims. (Cl. 99—4)

This invention is a new and useful method of accelerating the growth of chicks. In the course of numerous experiments I have discovered that the growth of chicks is accelerated by administering to the total intake (i. e., both solids and liquids consumed) the fatty acid ester of polyethylene glycol. The polyethylene glycols which I have found suitable are those in which the fatty acid or mixture of acids is from 8–18 carbon atoms and the polyethylene glycol is formed by the condensation of from 6–12 mols of ethylene glycol. Corresponding products can of course be made by condensing the fatty acid or mixture of acids with from 6–12 mols of ethylene oxide for each mol of fatty acid present. I have obtained best results by the use of a fatty acid or mixture of acids of from 10–14 carbon atoms in conjunction with a polyethylene glycol formed by the condensation of from 7–9 mols of ethylene glycol or by condensing the fatty acid or mixture of acids with from 7–9 mols of ethylene oxide. The fatty acids may be either saturated or unsaturated.

In the course of numerous experiments I have demonstrated that by the addition to the diet of the chicks of 15 thousandths of 1% of the said fatty acid ester of polyethylene glycol, based on the total amount of solid food supplied, air dry basis, I am able to accelerate the growth by a minimum of approximately 3%. By the addition of from 30–90 thousandths of 1% of the said ester based on total amount of solids supplied, air dry basis, I am able to accelerate growth by approximately 5% or more. The acceleration of growth appears to be sustained up to a maximum of 200 thousandths of 1% although the optimum efficiency appears to occur within the range of from 30–90 thousandths of 1%.

While the amount to be added is predicated on the total amount of solid food supplied, air dry basis, the actual introduction may be either in admixture with such foods or in solution in the water supplied to the chicks. The actual food efficiency, i. e., the gain in weight in relation to the total amount of food consumed, does not appear to be affected. The primary advantage is therefore that a greater output is obtainable in unit time from a single installation and since the chicks average larger, the ratio of fatty tissue to bone and offal is greater.

As a specific example a group consisting of 188 male and 216 female chicks were fed on a ration containing 50 grams for 100 lbs. of solids, air dry basis, of a fatty acid ester formed by combining one mol of the mixed fatty acids occurring in coconut oil and consisting predominantly of lauric and myristic acids, with a polyethylene glycol formed by condensing 8 mols of ethylene glycol. This group was compared with a control group of 204 males and 200 females, to the ration of which no addition was made. At the expiration of 70 days the group to the ration of which the fatty acid ester had been added, showed an increased gain in weight of 4.7 as compared to the control group.

I claim:

1. Method of accelerating the growth of chicks which comprises introducing from 15–200 thousandths of 1% based on the amount of solid foods, air dry basis, supplied of a fatty acid ester of polyethylene glycol selected from the esters in which the fatty acids carry from 8–18 carbon atoms and in which the polyethylene glycol is formed by condensing from 6–12 mols of ethylene glycol.

2. Method according to claim 1 in which the polyethylene glycol is formed by condensing from 7–9 mols of ethylene glycol.

3. Method of accelerating the growth of chicks which comprises introducing from 15–200 thousandths of 1% based on the amount of solid foods, air dry basis, supplied of a fatty acid ester of polyethylene glycol selected from the esters in which the fatty acids carry from 10–14 carbon atoms and in which the polyethylene glycol is formed by condensing from 7–9 mols of ethylene glycol.

CHARLES M. ELY.

No references cited.